United States Patent [19]
Fukushima

[11] 3,738,742
[45] June 12, 1973

[54] ILLUMINATION OPTICAL SYSTEM FOR PROJECTING MULTI-PHOTOGRAPHIC IMAGE

[75] Inventor: Yoshio Fukushima, Tokyo, Japan

[73] Assignee: Kabushiki Kaisha Ricoh, Tokyo, Japan

[22] Filed: May 7, 1971

[21] Appl. No.: 141,435

[30] Foreign Application Priority Data
Oct. 20, 1967 Japan.................................. 42/67455

[52] U.S. Cl. ................................................. 353/38
[51] Int. Cl. ............................................ G03b 21/14
[58] Field of Search ....................................... 353/38

[56] References Cited
UNITED STATES PATENTS
2,950,644  8/1960  Land et al........................ 353/38 X Primary Examiner—Harry N. Haroian
Attorney—Burgess, Ryan and Hicks

[57] ABSTRACT

An illumination optical system for projecting multi-photographic images wherein the illumination light loss is minimized is provided by disposing a group of micro-lenses substantially similar to that used in the photographing optical system in the of and backwardly of an image plane; or displacing an illumination light source relative to said image plane in plane symmetrical relation with a movable photographing aperture; or disposing a light diffusion plate between said image plane and said micro-lens group; or disposing photographing and projection condenser lenses in symmetrical relation with respect to said image plane; or disposing the light source and the aperture in point symmetrical relation with respect to the center of said image plane; or positioning the light source relatively closer to said image plane; or focusing the optical image of the light source forwardly of the image plane after the light beams have passed through the image plane.

5 Claims, 10 Drawing Figures

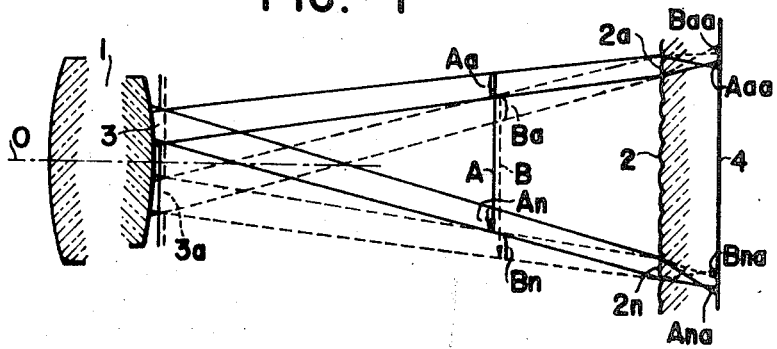

INVENTOR

YOSHIO FUKUSHIMA

BY Burgess, Ryan + Hicks
ATTORNEY

ILLUMINATION OPTICAL SYSTEM FOR PROJECTING MULTI-PHOTOGRAPHIC IMAGE

BACKGROUND OF THE INVENTION

The present invention relates to an illumination optical system for projecting multi-photographic images and more particularly an illumination optical system for use in a projecting device in which split images are synthesized and projected as one complete image, said images being obtained by a multi-photographic device of the type wherein the image of one object or scene is finely split and recorded upon a sensitive material at predetermined positions thereof as a multitude of split images and in the similar manner as described above the image of another object or scene is split and recorded upon the sensitive material without being overlapped with the previously recorded images.

When a sheet carrying positive or negative images (hereinafter referred to as a image sheet) used in the multi-photography is to record therein a number of N objects or scenes, an area of 1/N of the total area of the image sheet is used for recording one object or scene. In practice, however, a margin is provided between two adjacent images recorded in order to clearly distinguish one image from another. Assuming that the ratio of the effective image area to the whole area of the image sheet be $n$ ($n < 1$), the area of the image of one object or scene will be ($1/N \times n$) of the total area. Therefore, when this image sheet or object is illuminated uniformly as in the case of the case of the conventional color slide, only $n/N$ of the total illumination light passes through one image to be projected. For example, let it be assumed that $N = 49$ and $n = 0.7$, then the actual illumination light will become at least $N/n = 70$ times the illumination light actually required for illuminating one image.

In case of the illumination system for multi-photographic projection device, the most effective illumination can be attained if the multi-photographic optical system may be used as an optical projection system in such a manner that the illumination lights are directed in the direction opposite to the lights when photographed. As described in more detail hereinafter, however, the illumination lights cannot be traced back along the photographic light path when the uniform illumination system is used. When a diffusion plate is disposed immediately behind the image so as to provide some diffusability and is illuminated uniformly, some portion of the illumination lights may be traced back along the required light paths, but in this case, further illumination loss will occur. For example, when the thickness of the micro-lens is 5mm and the sensitive material is capable of recording therein 49 objects or scenes, the effective light beams or rays from the illumination light source will be approximately one-thirtieth of the total illumination light.

As described above, in the conventional illumination or projection system, large illumination losses occur in two steps so that in order to provide a sufficient intensity of illumination or luminance to the screen, unreasonably designed illumination system must be employed, thereby giving rise to various defects due to dissipation of heat from the illumination light source.

It is clearly understood that if at least one of the causes described above to give rise of the illumination or luminance loss is eliminated, the load imparted to the light source will be much relieved.

It is, therefore, one of the objects of the present invention to provide an illumination optical system for projecting multi-photographic images in which the illumination loss may be minimized.

Another object of the present invention is to provide a device best suited for applying the above described optical system.

SUMMARY OF THE INVENTION

According to the present invention, in order to minimize the loss of the illumination or luminance in the optical projection system for projecting multi-photographic images, the following various countermeasures are provided.

In accordance with one embodiment of the present invention, backwardly of and in closely spaced-apart relation with an image or object to be projected is disposed a micro-lens which is substantially similar to that used in a multi-photographic optical system.

In accordance with another embodiment of the present invention, in addition to the arrangement and the disposition of the micro-lens as described in the above embodiment, an illumination light source is so disposed as to be displaced in a plane which is in plane symmetrical relation with the aperture for photographic optical system with respect to said image or object to be projected.

According to a further embodiment of the present invention, a condenser lens is disposed in point symmetrical relation with another condenser lens interposed between the aperture and said image or object to be projected and furthermore the illumination light source is disposed at a position which is in point symmetrical relation with said aperture with respect to the center of said image or object to be projected, in addition to the provisions enumerated in the above embodiments.

According to a yet further embodiment of the present invention, the illumination light source is disposed more closely to said image or object to be projected so that the optical image of said light source may be formed in front of said image or object after the light beams have passed through said image or object.

According to still another embodiment of the present invention, backwardly of and in closely spaced-apart relation with said image or object to be projected is disposed the micro-lens whose thickness is thinner than that of the micro-lens incorporated in the photographic optical system.

According to one novel feature of the present invention, a planar reflecting mirror that is rotatable is utilized as means of displacing the optical system.

The novel features believed characteristic of the present invention are set forth in the appended claims. The invention itself, together with further objects and advantages thereof, may be best understood with reference to the following detailed description, taken in connection with the appended drawing.

BRIEF DESCRIPTION OF DRAWING:

FIG. 1 is an explanatory view of a multi-photographic device,

FIG. 2 is an explanatory view schematically illustrating some portion of a multitude of finely split images of objects or subjects recorded on one sensitive material.

Figure 3:
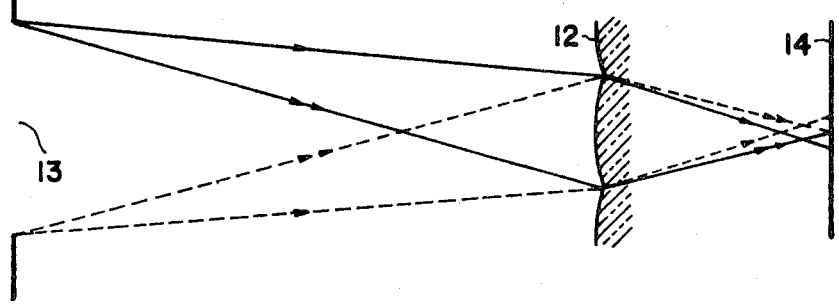
FIG. 3 is a schematic view illustrating the optical path of the light incident upon one of the micro-lenses which is corelated with the aperture, FIG. 4 to FIG. 8 inclusive are explanatory views illustrating the illumination light path in the embodiments of the present invention.

DESCRIPTION OF PREFERRED EMBODIMENTS:

Prior to the description of the illumination optical system according to the present invention, the multiphotographic system will be described. As shown in FIG. 1, the multi-photographic system is comprised of a first lens 1 having a relatively larger diameter, a second lens 2 and an aperture 3 disposed immediately behind the first lens 1. The second lens 2 comprises a group of a plurality of micro-lenses which are arrayed in rows and columns in the form of an integral lattice. The second lens 2 serves therefore to finely split the inverted image produced through the first lens and to focus upon a sensitive material 4 these finely split images as erect images. The aperture 3 is so disposed that it may be movable in the vertical and lateral or traverse directions in a plane perpendicular with respect to the optical axis 0 of the first lens 1. Thus, the aperture 3 serves to determine or select one of the micro-lenses constituting the second lens 2 so that this selected micro-lens may focus the image of a limited small portion of the image produced by the first lens upon a predetermined portion of the sensitive material 4.

The same effect can be attained even if the aperture 3 is positioned immediately before or within the first lens 1. As to the sensitive material 4 which is shown in the figure as being disposed backwardly of the second lens 2, this sensitive material 4 may be disposed directly upon the back surface of the second lens or in the spaced-apart relation with respect to the second lens 2 as far as the sensitive material 4 is positioned in the focal plane of the second lens 2.

Now let it be assumed that an inverted image of an object is produced through the first lens between the first and the second lenses. Then, one portion Aa of the image A included in the light ray incident upon one micro-lens element 2a through the aperture 3 is focused upon the sensitive material 4 as an erect split image Aaa. In the similar manner, another portion An of the image A included in the light ray incident upon another micro-lens element 2n through the aforementioned aperture 3 is focused upon the sensitive material 4 as a split image Ana.

Next when the aperture 3 is displaced to the position indicated by 3a and the first lens is directed toward another object or subject to be photographed, an image B is obtained as shown in FIG. 1. One portion Ba of the image B included in the light ray incident upon the aforementioned micro-lens 2a through the aperture 3a is focused upon the sensitive material 4 as an erect split image Baa. In a quite similar manner as described above, another portion Bn of the image B included in the light ray incident upon the aforementioned element 2n through the aperture 3a is focused upon the sensitive material 4 as a split image Bna.

Furthermore, when the aperture is displaced to a position intermediate the positions 3 and 3a, then the small part or portion of the image produced by the first lens 1 is focused upon the sensitive material 4 at an unexposed portion thereof, that is the portion intermediate of the aforementioned exposed portions thereof. It is of course required that when the aperture is displaced from one position to another, whenever photographing is made, the new position of the aperture 3 is not overlapped with the previous position thereof.

Thus finely split images are distributed over the whole surface of the sensitive material and are not overlapped with each other at all. The number of objects or scenes to be photographed by the device of the type described above is dependent upon the ratio of the exposure area obtained when the shield plate having the aperture is moved to the exposure area when the aperture is formed. In other words, the number of objects or scenes to be photographed is dependent upon the ratio of the effective area of the first lens when placed in the position of the aperture to the opening area of the aperture. Let it be assumed for example that the effective diameter of the first lens when placed in the position of the aperture be 30mm; the focal length thereof be 95mm; the distance between the aperture and the image produced by the first be 80mm; the distance between the aperture and the second lens 40mm; the area of the aperture be 2mm × 2mm; the pitch of displacement of the aperture in both of the vertical and transverse directions be 3mm; and the aperture be moved in both of the vertical and transverse directions in seven steps respectively, then the total of 49 objects or scenes are recorded upon a single sensitive material.

Since the objects or scenes are distributed over the whole surface of a single sensitive material as finely split images in the multi-photographic device, it is impossible to read or see what kinds of objects or scenes are recorded upon the sensitive material from these split images. The reproduction of the recorded objects or scenes can be made by illuminating these images from the back of the sensitive material in the optical system similar to the multi-photographic device used for recording these objects or scenes.

Now the illumination optical system for projecting the images of the type described hereinbefore will be described in detail with reference to the accompanying drawing. A multitude of images Aa, Ba, Ca, Da, and so on recorded by the multi-photographic device are schematically and partially shown in FIG. 2 in the form of a image sheet. Let it be assumed that one of the images, for example Aa, be selected for projection. In this case, the illumination light whose luminous intensity is 70 times as described hereinbefore will be required.

FIG. 3 illustrates the boundary lines of the optical path when photographed, and in this figure reference numeral 13 designates an aperture; 12, a micro-lens element; and 14, a sensitive material which will be used as an original or object to be projected. When the original or object 14 is uniformly illuminated upon projection thereof, the illumination light cannot be traced back as shown in FIG. 3. When a diffusion plate is placed immediately behind the images so as to provide the diffusion property to some extent and when the uniform illumination is applied to this diffusion plate, some of such illumination lights may be directed along the required optical paths but a considerable loss in light quantity will occur as described hereinbefore.

Figure 4:
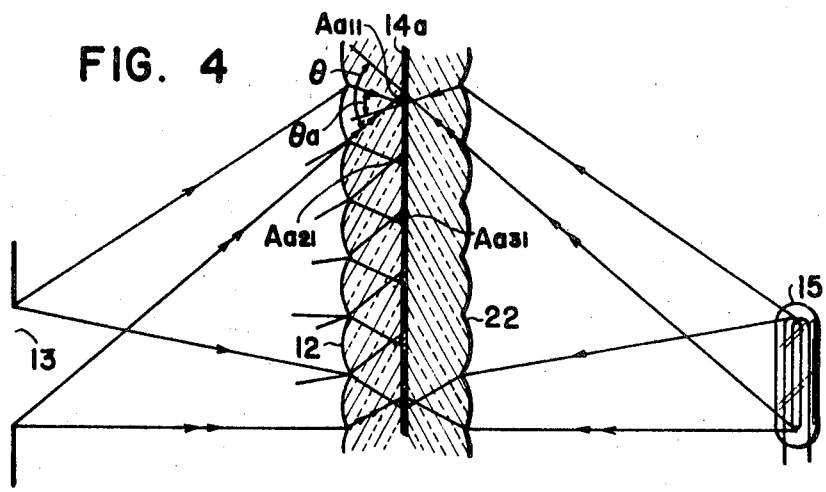

When at least one of the causes which lead to the above described luminance loss in light quantity can be eliminated, then the supply for the illumination light source will be much reduced. As one method of solving this problem, the present invention utilizes in an optical projection system a second micro-lens which is substantially similar to that used in the multi-photographic optical system as shown in FIG. 4. In this figure, reference numeral 12 designates the micro-lens or the second lens; 13, an aperture; 14a, an original or object to be projected; and 15, an illumination light source. When a specified image, for example, Aa only is to be illuminated for projection thereof, it is sufficient to illuminate only the image Aa so that when the image is illuminated by the optical system which is substantially symmetrical with the photographic optical system, the necessary and sufficient conditions for projection of this image will be attained as described above. In this method, however, the direction of the light after passing through the image portion is much deviated from the desired direction of the light (as shown in FIG. 4 by the angles $\theta$ and $\theta a$ respectively), so that the illumination light must have a remarkably wide diffusability immediately in front of the image to be projected. Therefore, of two illumination losses due to the illuminated area described hereinbefore, the illumination loss of "one-seventieth" can be compensated, but the other illumination loss of "one-thirtieth" will be further increased. Furthermore, the peripheral light quantity of luminance will be insufficient.

Figure 5:
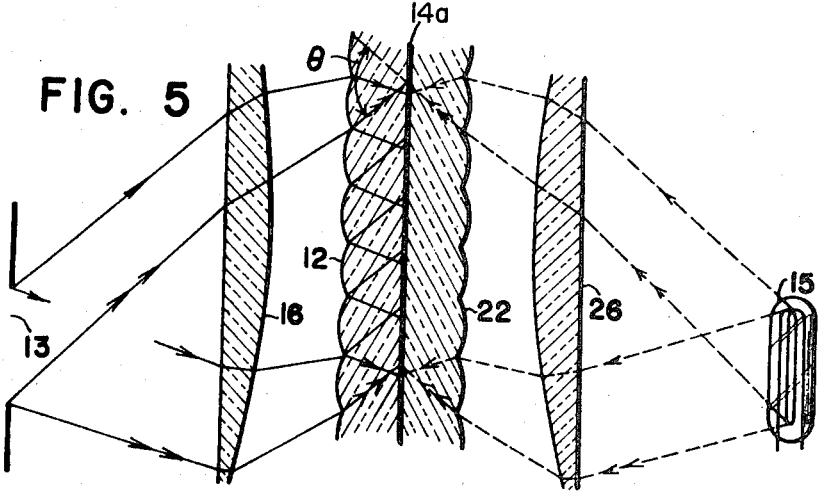

When the angle $\theta$ shown in FIG. 4 can be reduced to substantially the same as the angle $\theta a$, the degree of the diffusability may be reduced so that the loss will be lessened accordingly. In order to reduce the angle $\theta$ described above, it is preferable that the incident light upon the emulsion surface in case of photographing is made incident with an angle as near as a right angle. Therefore, according to the present invention, a condenser lens 16 is incorporated in the optical system as shown in FIG. 5 so that the angles of incident of the lights are substantially equal with each other all over the emulsion surface. When a condenser lens 26 which corresponds to the above mentioned condenser lens 16 is incoporated in the projection optical system, then the maximum value of the aforementioned angle $\theta$ can be reduced approximately one-half. In case of the sensitive material upon which 49 objects or scenes are recorded, when the method shown in FIG. 4 is used, the angle $\theta$ is approximately 34°, but the method shown in FIG. 5 reduces this angle $\theta$ to approximately 22°. With this difference of angles, the efficiency of the illumination light can be increased approximately 2.5 times as compared with that obtained in the method shown in FIG. 4. The condenser lens 16 is placed in the position of the image obtained through the first lens (not shown).

When the methods shown in FIGS. 4 and 5 are compared with each other, the distances between the positions where the images are focused through the respective micro-lenses will be wider as the focused positions are moved upwardly (When the aperture is located upwardly, the above described distance will become shorter). In case of the method shown in FIG. 5, the focused image positions are equidistantly distributed regardless of the positions of the aperture. Thus, utilizing the above described optical characteristics, the present invention provides an optical system as shown in FIG. 6.

That is, in the method shown in FIG. 5 the light source 15 and the aperture 13 are disposed in plane symmetry relation with respect to the emulsion surface. But in the method shown in FIG. 6, the illumination light source and the aperture are disposed in substantially point symmetrical relation with respect to the center C of the emulsion surface in such a manner that both of the micro-lens 22 and the condenser lens 26 are slightly deviated so that the illumination lights are made incident upon a required image only. In this method the light source and the aperture are disposed in equidistant and symmetical relation with respect to the point C of the emulsion surface, so that every image can be illuminated at the same time and furthermore the angle $\theta$ may be reduced substantially one-half of that shown in FIG. 5 since the direction of the light ray may be more perpendicular with respect to the micro-lens as compared with the case shown in FIG. 5. Therefore, a diffusion plate having a smaller angle of diffusion may be used so that the illumination efficiency can be increased. In case of the method shown in FIG. 6, the angle $\theta$ is approximately 12.5° and the efficiency can be increased seven and three times as compared with those shown in FIGS. 4 and 5 respectively.

Figure 6:
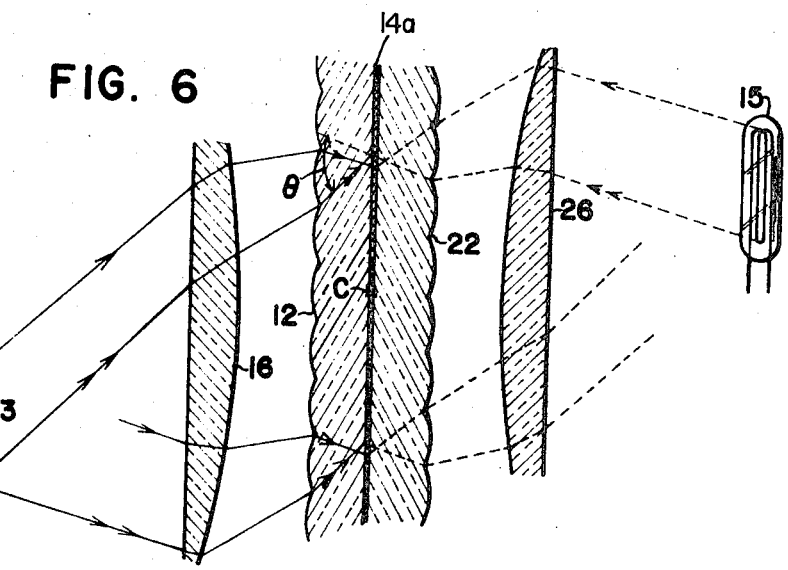
Figure 7:
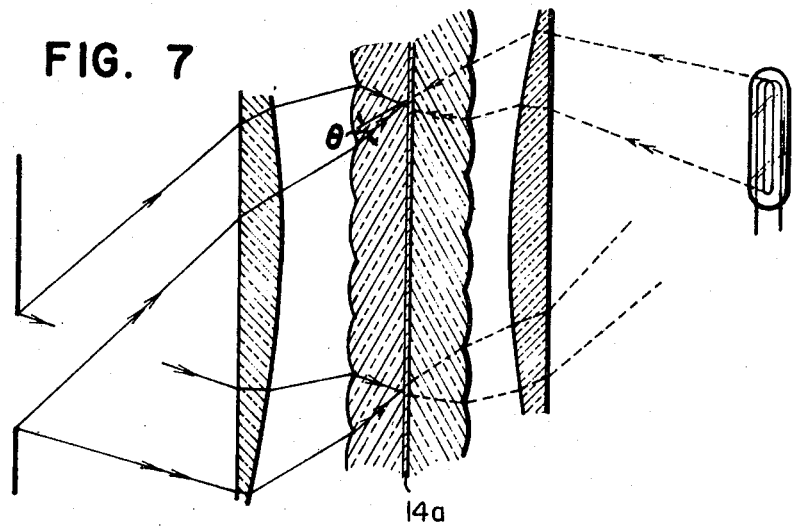

In FIG. 6, when the light source is disposed closer to the micro-lens so that the illumination lights may focus after passing through the image plane, the efficiency can be further increased. Such embodiments is shown in FIG. 7. In this case, the directions of the photographing and projection lights are substantially coincident so that it is not necessary to use a diffusion plate and the degree of the diffusion of lights caused naturally by the emulsion surface is sufficient enough. Therefore, in this system in which the light beams or rays from the light source is reduced to one-half due to the above described coincidence of the angles, very high efficiency of the illumination lights can be obtained.

Figure 8:
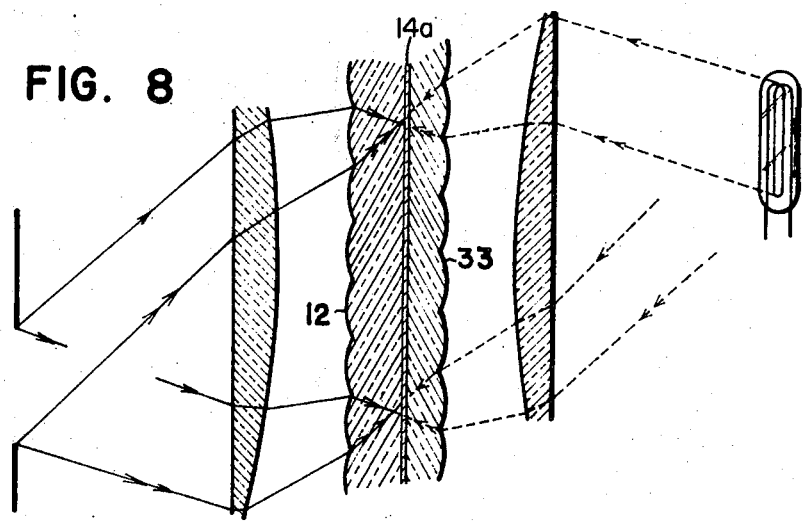

In order to further utilize the illumination light in more effective manner, the thickness of the micro-lens 33 on the side of the light source may be reduced as compared with that of the micro-lens 12 on the side of the aperture as shown in FIG. 8 so that the light rays may be focused after passing through the image plane. In this case, the condition in which no illumination loss occurs theoretically may be attained. However, in practice the diffusion, etc. will occur due to the emulsion surface. But this occurs also in the conventional slide projector so that in this case the relationship among the area of the image to be projected, the intensity or luminance of light source, the intensity of illumination of the screen, etc. may be considered the same as in the case of the conventional projector. Therefore, the conventional illumination light source may be utilized in the system and the problems pertaining to the heat dissipation etc. may be solved by well known techniques.

In the systems shown in FIGS. 7 and 8, it is required that both of the light source and the micro-lens on the side of the light source must be displaced whenever an image to be projected is selected. Since the displacement pitch of the micro-lens is of the order of 0.2mm, the tolerance is a problem when the illumination range is limited to only one scene. Therefore, in order to counter this problem, the illumination area or range may be slightly enlarged so that there will be no influence due to a small error. One of the methods to attain this purpose is to dispose the light source closer to the micro-lens. But in this method, the direction of the lights after passing through the image is deviated from the required direction so that this method is not preferable. Another method is to enlarge the size of the light source as compared with that of the aperture. In this method the defect as described above will not occur to a remarkable extent and it is very easy to provide in practice the light source whose dimensions are larger than 2mm × 2mm for the aperture of 2mm × 2mm. Thus, this method is the most preferable one.

Figure 9:
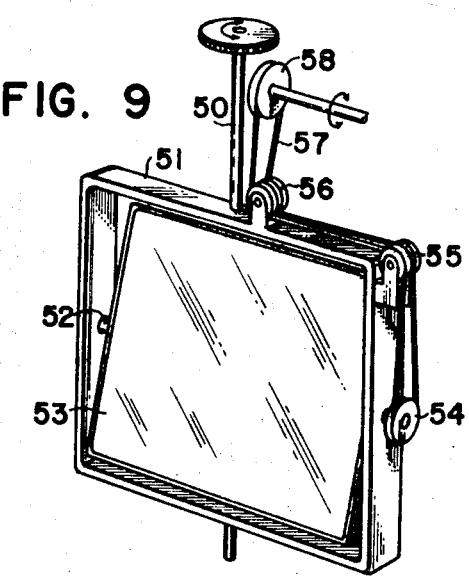
FIG. 9 is a perspective view of one embodiment of a device according to the present invention for optically displacing the illumination light source.

As to the method of displacing the light source with respect to the aperture, there are methods in which (1) the light source is directly displaced; (2) the light source is not displaced but some optical means is employed in order to attain the same effect as in the case when the light source is actually displaced; and (3) the combination of (1) and (2). One embodiment of the above described method (2) is shown in FIG. 9 wherein a planar mirror having a transverse shaft 52 is attached to a frame 51 having a vertical rotary shaft 50. A pulley 54 securely fixed to ore outer end of the transverse shaft 52 is interlocked with a driving pulley through a string 57 passing over intermediately intermediate pulleys 55 and 56 journalled to the frame 51.

Figure 10:
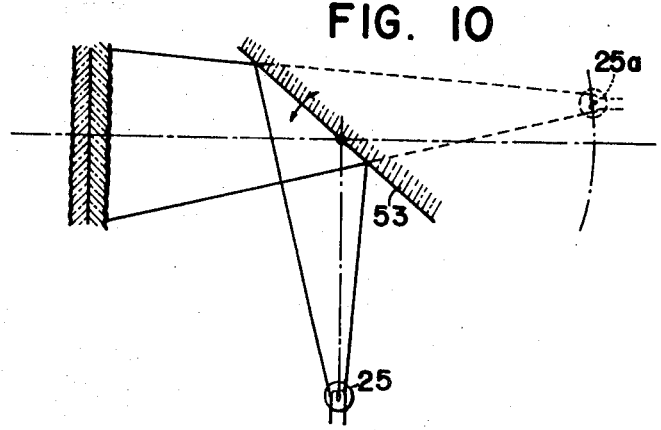
FIG. 10 is a diagrammatical view illustrating the use of the device shown in FIG. 9.

When the frame or the planar mirror 53 is rotated about the axis thereof in accordance with the displacement of the aperture in the vertical or transverse direction for selecting one image to be projected, the approximate displacement of the light source can be attained. In this case, the movement of the virtual image 25a of the light source 25 shown in FIG. 10 is the circular movement, but when the distance from the planar mirror and the light source is increased, the error caused by the aforementioned circular motion can be made negligible.

As one method of the above described combination, it is proposed that the light source is displaced in the vertical direction while the displacement of the light source in the transverse direction is made by the planar mirror having the vertical shaft. The same result will be attained in this case even when the above described relation between the light source and the planar mirror is reversed. Furthermore, when an elongated light source extending in one direction only is utilized, the displacement of the light source can be dispensed and the same result as described above can be attained only by rotating the planar mirror. The present invention has been described in detail with particular reference to preferred embodiments thereof but it will be understood that variations and modifications can be effected within the sprit and scope of the present invention as described hereinabove and as defined in the appended claims.

What is claimed is:

1. An illumination optical system for projecting multi-photographic images formed on an object strip, comprising:
    a flat element spaced from said object strip and having an aperture therein for the passage of light therethrough for the formation of the images;
    a first lens unit comprising a micro-lens group arranged in rows and columns spaced between said aperture element and said object strip and abutting one side of said object strip;
    a second lens unit comprising a micro-lens group arranged in rows and columns abutting the other side of said object strip;
    a light source spaced from said second lens group and remote from said aperture element, said light source directing light in a reverse direction into individual lenses of said second group to form an individual focus point for each lens with respect to said object strip, and the light diffusing outwardly from said focus point to pass through individual lenses of said first group at a predetermined angle of illumination;
    each individual micro-lens of said second micro-lens group being out of optical registration with a corresponding individual micro-lens of said first micro-lens group; and
    moving means for displacing the passage of light for selection of the individual focus point.

2. An illumination optical system according to claim 1, in which the spacing between said object strip and said light source is less than the spacing between said object strip and the aperture in said aperture element so that said individual focus points of the light in the reverse direction are located within said first group.

3. An illumination optical system according to claim 1, in which the thickness of individual lenses of said second group is less than the thickness of individual lenses of said first group, and said predetermined angle of illumination from said light source is substantially the same as the angle of light from the aperture in said aperture element when the images have been photographed.

4. An illumination optical system according to claim 3, in which said light source is fixed in place with respect to said system, and said moving means comprises a rotatable planar mirror is provided on which light from said light source is reflected for displacement through the system.

5. An illumination optical system according to claim 1, in which a first condenser lens is located between said first micro-lens group and said aperture, a second condenser lens is located between said second micro-lens group and said light source, and said first and second condenser lenses are out of optical registration in the same manner as the registration of said corresponding individual micro-lens groups.

* * * * *